(12) United States Patent
Boll et al.

(10) Patent No.: US 7,305,676 B1
(45) Date of Patent: Dec. 4, 2007

(54) COMMUNICATION DEVICE CONFIGURED FOR REAL TIME PROCESSING OF USER DATA TO BE TRANSMITTED

(75) Inventors: Gunnar Boll, Neubiberg (DE); Axel Bürck, Taufkirchen (DE); Gonzalo Lucioni, Witten (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/566,937

(22) Filed: May 8, 2000

(30) Foreign Application Priority Data

May 6, 1999 (DE) ................................. 199 20 985

(51) Int. Cl.
G06F 9/46 (2006.01)
G06F 15/00 (2006.01)
G06F 15/76 (2006.01)
H04L 12/50 (2006.01)
H04Q 11/00 (2006.01)

(52) U.S. Cl. .................. 718/107; 712/35; 712/213; 370/357; 370/437

(58) Field of Classification Search .............. 712/15, 712/18, 29, 35, 213, 1, 2, 9, 32–37; 711/117; 455/78, 450–455; 709/107, 217, 225, 226, 709/235; 370/79, 259, 359, 419, 358, 357, 370/360, 431, 437; 719/322, 328, 310, 312–314; 718/107, 100–106, 108; 710/11, 18, 20, 710/64, 68, 300
See application file for complete search history.

(56) References Cited

U.S. PATENT DOCUMENTS

| | | | | |
|---|---|---|---|---|
| 5,291,614 A | * | 3/1994 | Baker et al. ................. | 712/35 |
| 5,404,522 A | * | 4/1995 | Carmon et al. ............. | 709/107 |
| 5,497,373 A | * | 3/1996 | Hulen et al. ................ | 370/259 |
| 5,590,284 A | * | 12/1996 | Crosetto ..................... | 712/29 |
| 5,742,840 A | * | 4/1998 | Hansen et al. .............. | 712/210 |
| 5,748,866 A | * | 5/1998 | Edgar .......................... | 345/428 |
| 5,862,396 A | * | 1/1999 | Motomura ................... | 712/14 |
| 5,901,301 A | * | 5/1999 | Matsuo et al. .............. | 712/212 |
| 5,909,564 A | * | 6/1999 | Alexander et al. .......... | 710/316 |
| 5,946,487 A | * | 8/1999 | Dangelo ...................... | 717/148 |
| 5,963,744 A | * | 10/1999 | Slavenburg et al. .......... | 712/9 |

(Continued)

FOREIGN PATENT DOCUMENTS

DE     692 17 664 T2     9/1997

(Continued)

OTHER PUBLICATIONS

"Distibuted Systems Concept and design". Coulouris et. al. 1994.*

(Continued)

*Primary Examiner*—Haresh Patel
(74) *Attorney, Agent, or Firm*—Laurence A. Greenberg; Werner H. Stemer; Ralph E. Locher

(57) ABSTRACT

A communication device is provided which has a programmable multichannel signal processor for real time processing of user data, which are to be transmitted, within the framework of a plurality of real time applications. The real time applications are each assigned different, application-specific programmed processing channels of the multichannel signal processor for program-controlled processing of user data.

11 Claims, 1 Drawing Sheet

U.S. PATENT DOCUMENTS

| | | | | |
|---|---|---|---|---|
| 5,982,459 | A * | 11/1999 | Fandrianto et al. | 348/425.3 |
| 6,003,129 | A * | 12/1999 | Song et al. | 712/244 |
| 6,041,400 | A * | 3/2000 | Ozcelik et al. | 712/35 |
| 6,044,225 | A * | 3/2000 | Spencer et al. | 710/52 |
| 6,088,783 | A * | 7/2000 | Morton | 712/22 |
| 6,223,274 | B1 * | 4/2001 | Catthoor et al. | 712/34 |
| 6,282,706 | B1 * | 8/2001 | Chauvel et al. | 717/150 |
| 6,308,253 | B1 * | 10/2001 | Gadre et al. | 712/22 |
| 6,400,996 | B1 * | 6/2002 | Hoffberg et al. | 700/83 |
| 6,425,054 | B1 * | 7/2002 | Nguyen | 711/117 |
| 6,504,838 | B1 * | 1/2003 | Kwan | 370/352 |
| 6,515,964 | B1 * | 2/2003 | Cheung et al. | 370/230 |
| 6,751,221 | B1 * | 6/2004 | Saito et al. | 370/392 |
| 6,862,622 | B2 * | 3/2005 | Jorgensen | 709/226 |

FOREIGN PATENT DOCUMENTS

| | | |
|---|---|---|
| DE | 197 35 981 A1 | 3/1998 |
| WO | 97/28628 | 8/1997 |

OTHER PUBLICATIONS

Leonid Schneiderman: "Application of ATM Traffic Analysis techniques in the Field of Digital Signal Processing", *Proceedings of the 1997 South African Symposium on Communications and Signals Processing, Grahamstown, South Africa*, Sep. 9, 1997, pp. 137-140.

* cited by examiner

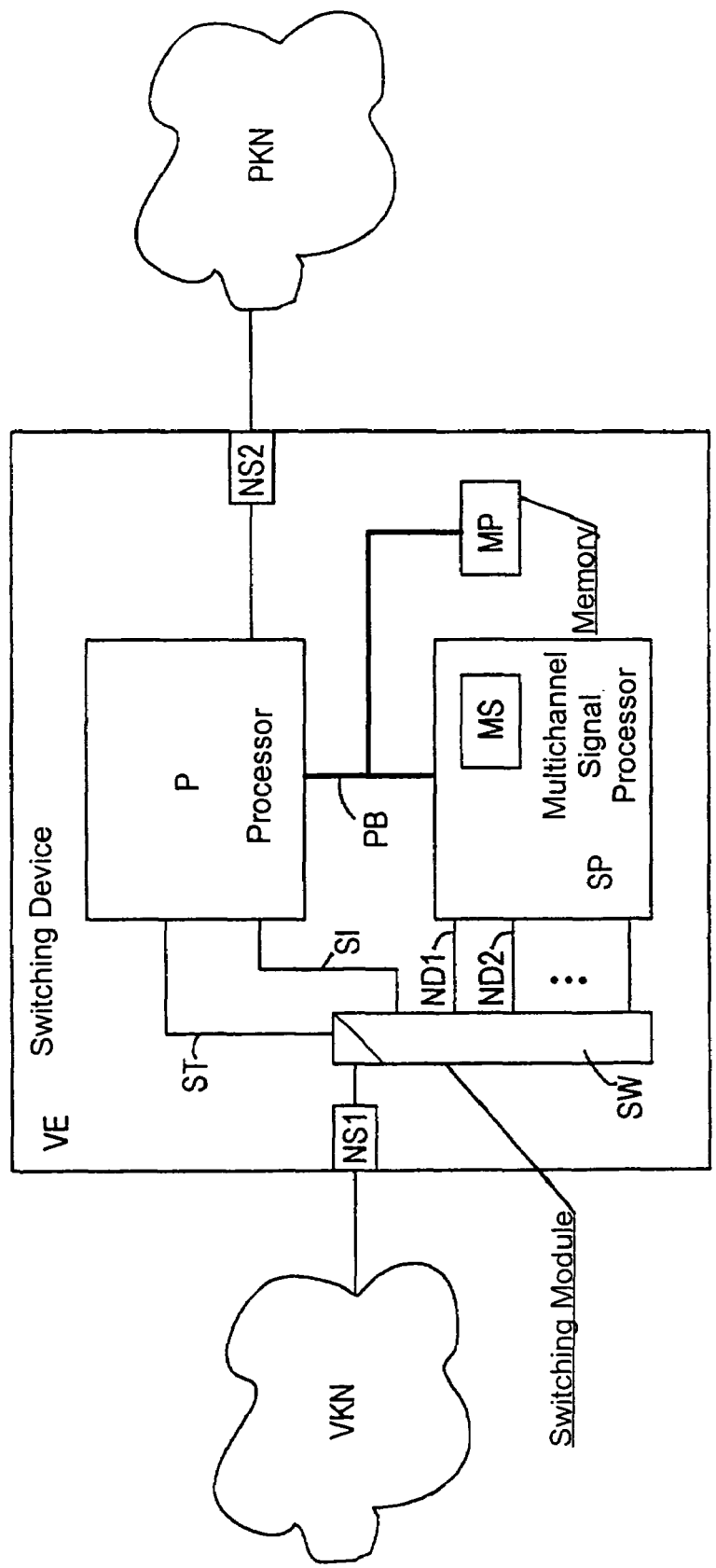

COMMUNICATION DEVICE CONFIGURED FOR REAL TIME PROCESSING OF USER DATA TO BE TRANSMITTED

CROSS REFERENCE TO RELATED APPLICATIONS

This application claims the priority of German Application No. 199 20 985.5, filed May 6, 1999, under 35 U.S.C. 119.

BACKGROUND OF THE INVENTION

Field of the Invention

The invention relates to a communication device configured for real time processing of user data to be transmitted. In this case, user data are to be understood, inter alia, as voice data, video data, facsimile data, file data, program data, measurement data or user information.

Because of an increasing convergence of voice and data networks, and of mobile networks and fixed networks, there is currently a considerable rise in the demands placed on the functionality of communication devices. In addition to high transmission rates and switching speeds, modern communication devices are also increasingly demanding abilities for real time processing of user data. Examples for such real time applications, already implemented in many communication devices, for real time processing of user data are compression and decompression of voice, video or file data, processing of facsimile data, voice transmission using an internet protocol (VoIP) or provision of a modem functionality, that is to say conversion of digital information into signals of the voice frequency band and their inverse transformation. Also targeted is integration of further real time applications, for example for voice or data encoding or for speech recognition.

As a rule, a very high processing capacity is required for real time processing of user data, in particular in the case of very high, user data transmission rates. For this reason, in the case of previous communication devices it is generally a special hardware module, optimized for the respective real time application, for example an application-specific semiconductor chip (ASIC) or a special plug-in module, which is provided for each real time application for real time processing of user data.

It may be remarked at this juncture that, by contrast, real time processing of signaling data in a communication device places substantially less stringent demands on the processing capacity of the communication device, since the data volume of signaling data is generally substantially lower than the data volume of user data.

In a communication device in the case of which different, application-specific hardware modules are respectively provided for different real time applications, it is necessary to intervene in the relevant hardware for each expansion or change in the real time functionality of the communication device. Consequently, flexible adaptation, according to need, of the real time functionality to varying requirements is heavily limited. In order to simplify such hardware interventions, slots for holding additional hardware modules are usually provided in the case of previous communication devices. However, the respective number of these slots also limits the number of real time applications that can be implemented. Expansions which go beyond it are therefore mostly excluded or can be carried out only with a substantial additional outlay.

SUMMARY OF THE INVENTION

It is accordingly an object of the invention to provide a communication device configured for real time processing of user data to be transmitted which overcomes the above-mentioned disadvantages of the prior art devices of this general type, which permits flexible implementation, configuration, modification and expansion of real time applications for the purpose of real time processing of user data.

With the foregoing and other objects in view there is provided, in accordance with the invention, a communication device. The communication device includes a circuit configuration for real time processing of user data to be transmitted within a framework of a plurality of real time applications. The circuit configuration has a programmable multichannel signal processor with application-specific programmed processing channels for parallel real time processing of the user data to be processed within the framework of the real time applications. The real time applications each being assigned to different ones of the application-specific programmed processing channels of the multichannel signal processor for program-controlled processing of the user data.

A substantial advantage of the communication device according to the invention consists in that real time applications for processing user data—including in relatively large numbers—can be implemented in a simple way and can be adapted to changing operating requirements. All that is required for this purpose is an expansion or modification of the operating software for the programmable multichannel signal processor, whose processing channels can be occupied optionally with the real time application. A more complicated and more cost intensive exchange of specialized hardware components—as required in the case of previous communication devices—is not required. Expanding or modifying the operating software can be performed in a particularly simple way by virtue of the fact that the operating software is transmitted from a maintenance device via a communication network to the communication device and installed there. Also possible in a similar way is a remote configuration of the real time applications, for example their assignment to processing channels of the multichannel signal processor or a modification of operating parameters.

It is advantageous that real time applications can be implemented simply, particularly in the case of large communication devices such as, for example, switching devices or network nodes of communication networks, since these frequently have to provide a multiplicity of different real time applications, and the latter frequently have to be adapted to modified or new standards or to be functionally expanded.

In accordance with an advantageous development of the invention, it is possible to provide an additional programmable processor for processing one or more communication protocols. This relieves the loading on the multichannel signal processor that, as a signal processor configured for real time applications, is frequently suitable only conditionally for efficient protocol processing. The additional programmable processor can be connected to the multichannel signal processor via a processor bus which permits rapid communication between both processors and, if appropriate, joint processing of applications.

According to a further advantageous development of the invention, a device can be provided for dynamic assignment of real time applications to processing channels of the multichannel signal processor. Such a dynamic assignment can advantageously be oriented to temporary processing requirements for the user data. Thus, for example, in the case of a rise in the data rate of user data to be processed by a real time application, additional processing channels, processing in parallel, of the multichannel signal processor can be assigned to this real time application. These additionally assigned processing channels can be released again as appropriate for other real time applications given a fall in the data rate. It is also possible in this way for user data with a strongly varying data rate such as, for example, file data to be processed efficiently in real time.

In accordance with a further advantageous development of the invention, it is possible to provide a switching device which distributes the flow of user data to be processed within the framework of real time applications over application-specific processing channels, and thus feeds it to the multichannel signal processor.

Real time applications which can advantageously be implemented with the aid of the multichannel signal processor include, in particular, real time applications for processing signaling data, for compressing and/or decompressing user data, in particular voice, video and file data, for implementing a modem functionality, for encoding and/or decoding user data, for voice recognition in the case of voice data, for processing facsimile data, for voice transmission using an internet protocol (VoIP) and for signaling in the voice frequency band, for example calling number identification within the framework of so-called CLIP features (Calling Line Identification and Presentation).

The communication device according to the invention can advantageously also be implemented as a module for integration into a further communication device. Such a module can, for example, be configured in the form of a plug-in module for plugging into a larger switching device or into a network node of a communication network.

Other features which are considered as characteristic for the invention are set forth in the appended claims.

Although the invention is illustrated and described herein as embodied in a communication device configured for real time processing of user data to be transmitted, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

The FIG. 1 of the drawing is a block diagram of a switching device connected to two communication networks according to the invention.

DESCRIPTION OF THE PREFERRED EMBODIMENTS

Referring now to the single FIGURE of the drawing in detail, there is shown a switching device VE which is connected to a connection-oriented communication network VKN such as, for example, a circuit-switched or video-switched communication network and to a packet-switching communication network PKN. The switching device VE includes as functional components a processor P, a memory MP, a multichannel signal processor SP with an integrated memory MS, a switching module SW with a multiplex/demultiplex functionality, a network interface NS1 to the connection-oriented communication network VKN, and a network interface NS2 to the packet-switching communication network PKN. The processor P, the multichannel signal processor SP and the memory MP are connected to one another via a processor bus PB. The processor P is also coupled to the network interface NS2 and—via a control bus ST and via a signaling channel SI—to the switching module SW. The switching module SW is further coupled, for its part, to the network interface NS1 and, via a plurality of user data channels ND1, ND2, . . . , to the multichannel signal processor SP. Each of the user data channels ND1, ND2, . . . is assigned in this case on the part of the multichannel signal processor SP a real time application, running on the latter, for real time processing of user data transmitted via the relevant user data channel. In this case, the same real time application can also be assigned to a plurality of user data channels. The programs and data for carrying out the real time applications are stored in the integrated memory MS. The illustrated functional components of the switching device VE can advantageously be disposed in one or more modules.

Data coming from the connection-oriented communication network VKN and which are to be switched within the framework of existing connections and/or connections to be established are received at the network interface NS1 and relayed to the switching module SW. The data to be transmitted within the framework of a particular connection are transmitted in this case in one or more connection-specific transmission channels (not illustrated individually), for example using a time-division multiplex method (TDM). The switching module SW, which can be implemented as a multiplexer/demultiplexer, for example, divides the received data into signaling data and user data, the signaling data being transmitted to the processor P via the signaling channel SI. In addition to switching information, the signaling data also contain processing information which specify how user data respectively assigned to the processing information are to be processed. With the aid of an item of such processing information, the user data respectively assigned to this item of processing information are each assigned by the processor P a real time application of the multichannel signal processor SP for processing the user data. Depending on the assignment of user data to real time applications, the switching module SW is controlled by the processor P via the control bus ST. The control is performed in this case such that the user data to be processed are distributed over the application-specific user data channels ND1, ND2, . . . by the switching module SW in accordance with the real time applications respectively assigned to them, and are transmitted via these user data channels to the multichannel signal processor SP.

A typical example of an assignment of user data channels to real time applications is specified below.

ND1: compression of voice data at a data rate of 64 kbit/s,

ND2: decompression of compressed voice data at a data rate of 32 kbit/s,

ND3: encoding of data,

ND4: processing of facsimile data,

ND5: processing of video data using the ITU-T Recommendation H.320,

ND6: extraction of data converted into signals of the voice frequency band for the purpose of user signaling in accordance with the so-called CLIP feature, and ND7: extraction of digital information converted into signals of the voice frequency band, for example within the framework of a modem functionality.

The user data channels ND3, ND4, ND5, ND6 and ND7 are not explicitly illustrated in the FIGURE.

The individual user data channels ND1, ND2, . . . can be occupied in principle with any desired real time applications by use of appropriate programming of the multichannel signal processor SP. The application-specific programs and data are to be stored in the memory MS for the purpose of programming the multichannel signal processor SP. These application-specific programs and data are advantageously held in reserve in the memory MP, for example in a nonvolatile storage device and transmitted into the memory MS with each run-up of the switching device VE. The programming of the multichannel signal processor SP can preferably be modified by transmitting updated programs and data via the communication networks VKN or PKN. The transmission of the updated programs and data into the memory MS can be initiated, for example, by a co-transmitted control signal.

The user data transmitted via the user data channels ND1, ND2, to the multichannel signal processor SP are processed in the multichannel signal processor SP by the real time applications respectively assigned to the user data channels ND1, ND2. The processed user data are subsequently relayed in accordance with their transmission destination. User data whose transmission destination is in the connection-oriented communication network VKN are retransmitted in this case to the switching module SW via the user data channels ND1, ND2, . . . . In the case of bidirectional user data channels, the transmission can be performed via the same user data channels ND1, ND2, . . . , like the transmission to the multichannel signal processor SP. The switching module SW thereupon switches the user data to be processed, in a fashion assigned to their respective connections, in connection-specific transmission channels via the network interface NS1 into the connection-oriented communication network VKN, for example to a destination terminal. Processed user data whose transmission destination is in the packet-switching communication network PKN are, by contrast, transmitted by the multichannel signal processor SP to the processor P, which converts the user data into data packets addressed to the transmission destination, and transmits them into the packet-switching communication network PKN via the network interface NS2. It is possible in this way, for example, to switch voice data using an internet protocol (VoIP), facsimile data using an internet protocol (FoIP) and/or video data in accordance with the ITU-T Recommendation H.323.

We claim:

1. A communication device for real time processing of data, comprising:
    a circuit configuration having a programmable multichannel signal processor with different application-specific programmable processing channels, said different application-specific programmable processing channels carrying out in parallel different real time applications, the real time applications each being assigned to different ones of said application-specific programmable processing channels of said multichannel signal processor for program-controlled processing of the data;
    an additional programmable processor for processing a communication protocol connected to said signal processor, said programmable processor converting the data into data packets for transmission;
    a switching device for distributing the data to said application-specific programmable processing channels of said programmable multichannel signal processor for processing; and
    a device for dynamically assigning the real time applications to said application-specific programmable processing channels of said programmable multichannel signal processor so that in a case of a rise in a data rate of the data to be processed by a given real time application of the real time applications, additional processing channels of said signal processor, processing in parallel, are assigned to the given real time application and in case of a fall in the data rate of the data the additional processing channels are released for other real time applications of the real time applications, the real time applications including processing of packet-switched data and processing connection-oriented data, and said signal processor being configured to process at least two types of real time applications selected from the group consisting of processing video data, processing voice data, processing file data, processing facsimile data, processing modem data, processing voice recognition, processing voice transmissions in Internet Protocol, and signaling in voice frequency band.

2. The communication device according to claim 1, wherein said circuit configuration has a processor bus connecting said programmable multichannel signal processor to said additional programmable processor.

3. The communication device according to claim 1, including a real time application for processing signaling data, said real time application is assigned to at least one of said application-specific programmable processing channels of said programmable multichannel signal processor.

4. The communication device according to claim 1, including a real time application for at least one of compressing and decompressing the data, said real time application is assigned to at least one of said application-specific programmable processing channels of said programmable multichannel signal processor.

5. The communication device according to claim 1, including a real time application for implementing a modem functionality, said real time application is assigned to at least one of said application-specific programmable processing channels of said programmable multichannel signal processor.

6. The communication device according to claim 1, including a real time application for encoding and decoding the data, said real time application is assigned to at least one of said application-specific programmable processing channels of said programmable multichannel signal processor.

7. The communication device according to claim 1, including a real time application for voice recognition in the case of voice data, said real time application is assigned to at least one of said application-specific programmable processing channels of said programmable multichannel signal processor.

8. The communication device according to claim 1, including a real time application for processing facsimile data, said real time application is assigned to at least one of said application-specific programmable processing channels of said programmable multichannel signal processor.

9. The communication device according to claim 1, including a real time application for voice transmission using an internet protocol, said real time application is assigned to at least one of said application-specific programmable processing channels of said programmable multichannel signal processor.

10. The communication device according to claim 1, wherein said circuit configuration is implemented as a module for integration into a further communication device.

11. The communication device according to claim 1, wherein the data are selected from the group consisting of voice data, video data, facsimile data, file data, program data, measurement data, and user information data.

* * * * *